(12) United States Patent
Strashny

(10) Patent No.: US 12,496,935 B2
(45) Date of Patent: Dec. 16, 2025

(54) THREE-RAIL POWER SUPPLY SYSTEM

(71) Applicant: Caterpillar Inc., Peoria, IL (US)

(72) Inventor: Igor Strashny, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 519 days.

(21) Appl. No.: 18/105,024

(22) Filed: Feb. 2, 2023

(65) Prior Publication Data

US 2024/0262210 A1   Aug. 8, 2024

(51) Int. Cl.
| | |
|---|---|
| *B60M 7/00* | (2006.01) |
| *B60L 5/39* | (2006.01) |
| *B60M 1/12* | (2006.01) |
| *B60M 1/30* | (2006.01) |
| *B60M 3/00* | (2006.01) |
| *B60M 3/02* | (2006.01) |

(Continued)

(52) U.S. Cl.
CPC ............. *B60M 7/00* (2013.01); *B60L 5/39* (2013.01); *B60M 1/12* (2013.01); *B60M 1/30* (2013.01); *B60M 3/00* (2013.01); *B60M 3/02* (2013.01); *B60L 3/0069* (2013.01); *B60L 3/04* (2013.01); *B60L 5/36* (2013.01); *B60L 9/00* (2013.01); *B60L 53/14* (2019.02); *B60L 2200/36* (2013.01); *B60L 2200/40* (2013.01); *B60L 2200/44* (2013.01)

(58) Field of Classification Search
CPC ............... B60L 3/0069; B60L 2200/40; B60L 2200/36; B60L 5/36; B60L 53/14; B60L 9/00; B60L 2200/44; B60L 3/04; B60M 3/00; B60M 1/30; B60M 7/00; B60M 3/02

USPC ............................ 361/42; 191/33 R; 324/509
See application file for complete search history.

(56) References Cited

U.S. PATENT DOCUMENTS

| | | |
|---|---|---|
| 3,581,152 A | 5/1971 | Hunt |
| 3,796,941 A | 3/1974 | Danz et al. |

(Continued)

FOREIGN PATENT DOCUMENTS

| | | |
|---|---|---|
| CN | 104578833 | 4/2015 |
| WO | 2014039191 A1 | 3/2014 |

(Continued)

OTHER PUBLICATIONS

Written Opinion and International Search Report for Int'l. Patent Appln. No.PCT/US2024/011779, mailed May 13, 2024 (9 pgs).

*Primary Examiner* — Zachary L Kuhfuss
(74) *Attorney, Agent, or Firm* — Lee & Hayes, PLLC

(57) ABSTRACT

A three-rail power supply system includes a power supply having positive, negative, and neutral terminals, a rail system having a power supply end and a termination end, and an asymmetric resistor network. The rail system includes a positive rail, a negative rail, and a ground rail coupled to the positive terminal, the negative terminal, and the neutral terminal, respectively. The negative rail is disposed parallel to the positive rail. The ground rail is disposed in parallel to, and between, the positive rail and the negative rail, and is electrically grounded at a plurality of intervals between the power supply end and termination end. The asymmetric resistor network includes two pairs of resistors asymmetrically coupled to the rail system at the power supply end and termination end, and is configured to limit a fault current through a faulty connection in response the positive, negative, and/or ground rails experiencing the faulty connection.

20 Claims, 11 Drawing Sheets

(51) Int. Cl.
*B60L 3/00* (2019.01)
*B60L 3/04* (2006.01)
*B60L 5/36* (2006.01)
*B60L 9/00* (2019.01)
*B60L 53/14* (2019.01)

(56) References Cited

U.S. PATENT DOCUMENTS

| | | | |
|---|---|---|---|
| 6,573,726 | B1 | 6/2003 | Roberts et al. |
| 6,678,132 | B1 | 1/2004 | Carruthers et al. |
| 7,881,078 | B2 | 2/2011 | Pereira et al. |
| 8,700,283 | B2* | 4/2014 | Lammers ............ B60L 15/2009 |
| | | | 701/70 |
| 8,964,339 | B2 | 2/2015 | Li et al. |
| 9,041,288 | B2 | 5/2015 | Bader |
| 9,385,522 | B2 | 7/2016 | O'Regan et al. |
| 9,614,457 | B2 | 4/2017 | Pan et al. |
| 2011/0094841 | A1* | 4/2011 | Mazumdar ............ B60M 7/00 |
| | | | 191/33 R |
| 2011/0216451 | A1* | 9/2011 | Haines .................. H02H 3/338 |
| | | | 361/93.6 |
| 2012/0126625 | A1 | 5/2012 | Maher et al. |
| 2014/0167779 | A1* | 6/2014 | Si ........................ G01R 31/42 |
| | | | 324/509 |
| 2016/0013653 | A1 | 1/2016 | Dorn et al. |
| 2018/0048303 | A1 | 2/2018 | Lenker et al. |
| 2020/0223313 | A1* | 7/2020 | Ishida .................. B60L 3/0069 |
| 2020/0259324 | A1 | 8/2020 | Beucler |
| 2022/0089033 | A1* | 3/2022 | Li ............................ B60L 5/36 |

FOREIGN PATENT DOCUMENTS

| | | |
|---|---|---|
| WO | 104578833 | 4/2015 |
| WO | WO2021028041 | 2/2021 |

* cited by examiner

```
┌─────────────────────────────────────────────────────┐
│ COUPLE A FIRST RESISTOR (FIRST RESISTANCE VALUE) TO THE │
│ POSITIVE RAIL AND THE GROUND RAIL AT THE TERMINATION END │
│                        1102                         │
└─────────────────────────────────────────────────────┘
                          ↓
┌─────────────────────────────────────────────────────┐
│ COUPLE A SECOND RESISTOR (SECOND RESISTANCE VALUE) TO THE │
│ NEGATIVE RAIL AND THE GROUND RAIL AT THE TERMINATION END │
│                        1104                         │
└─────────────────────────────────────────────────────┘
                          ↓
┌─────────────────────────────────────────────────────┐
│ COUPLE A THIRD RESISTOR (FIRST RESISTANCE VALUE) TO THE │
│ NEGATIVE RAIL AND THE GROUND RAIL AT THE POWER SUPPLY END │
│                        1106                         │
└─────────────────────────────────────────────────────┘
                          ↓
┌─────────────────────────────────────────────────────┐
│ COUPLE A FOURTH RESISTOR (SECOND RESISTANCE VALUE) TO THE │
│ POSITIVE RAIL AND THE GROUND RAIL AT THE POWER SUPPLY END │
│                        1108                         │
└─────────────────────────────────────────────────────┘
                          ↓
┌─────────────────────────────────────────────────────┐
│ MONITOR A FIRST VOLTAGE BETWEEN THE POSITIVE RAIL AND THE │
│ NEUTRAL TERMINAL, A SECOND VOLTAGE BETWEEN THE NEGATIVE │
│ RAIL AND THE NEUTRAL TERMINAL, AND A CURRENT FROM THE │
│ NEUTRAL TERMINAL TO THE GROUND AT THE POWER SUPPLY END │
│                        1110                         │
└─────────────────────────────────────────────────────┘
                          ↓
┌─────────────────────────────────────────────────────┐
│ LIMIT THE FAULT CURRENT THROUGH A FAULTY CONNECTION IN │
│ RESPONSE TO ONE OR MORE OF THE POSITIVE RAIL, THE NEGATIVE │
│ RAIL, AND THE GROUND RAIL EXPERIENCING A FAULTY CONNECTION │
│                        1112                         │
└─────────────────────────────────────────────────────┘
                          ↓
┌─────────────────────────────────────────────────────┐
│ GENERATE AN ALARM BASED ON AN ABNORMAL MONITORED VALUE │
│ FROM AT LEAST ONE OF THE FIRST VOLTAGE MONITOR, THE SECOND │
│ VOLTAGE MONITOR, OR THE CURRENT MONITOR │
│                        1114                         │
└─────────────────────────────────────────────────────┘
```

FIG. 11

THREE-RAIL POWER SUPPLY SYSTEM

TECHNICAL FIELD

The present disclosure relates to a power supply system, and more particularly, to a system and method for detecting a fault in a three-rail power supply system.

BACKGROUND

In a three-line power transmission system, such as a three-rail system commonly used for providing power to electric vehicles and trains, the electrified rail, or the third rail, is usually located outside of the two running rails, or in some systems, located between the two running rails. Similar systems may be utilized to supply power to, and/or charge batteries of, machines used to perform a variety of tasks at a worksite. For example, a machine may be driven by a prime mover of the machine, such as an electric motor, and used to excavate, move, shape, contour, and/or remove material present at the worksite, such as gravel, concrete, asphalt, soil, and/or other materials. For example, a machine may be equipped with a work implement for performing tasks, such as drilling, digging, carrying, raising, and/or depositing material. The work implement may include augers, brushcutters, brooms, grapples, hammers, pulverizers, rippers, rotors, shovels, and so forth. However, because the third rail carries high voltage, typically 600-1,500 V, and the third rail presents danger to anyone or anything coming into contact with it.

U.S. Pat. No. 3,581,152 by Hunt ("the '152 patent"), issued May 25, 1971, describes grounding system for high voltage DC transmission lines which provides protection for, and detection of, changes in the normal operating mode of the high voltage system. In particular, the '152 patent describes a transmission system having a single connection to the earth, current sensitive means at the single earth connection, and voltage sensitive means at the remote locations to detect fault conditions and to shut down the system where necessary. However, the changes in the normal condition described in the '152 patent limited to the load current flashing over the insulator and a fault developing between the positive line and the tower of the transmission line, which is earthed, or between the negative line and the tower.

The systems and methods described herein are directed to addressing one or more of the drawbacks set forth above.

SUMMARY

According to a first aspect, a three-rail power supply system may include a power supply, a rail system having a power supply end and a termination end, and an asymmetric resistor network coupled to the rail system. The rail system may include a positive rail coupled to a positive terminal of the power supply at the power supply end, a negative rail coupled to a negative terminal of the power supply at the power supply end, the negative rail disposed parallel to the positive rail, and a ground rail coupled to a neutral terminal of the power supply at the power supply end, the ground rail disposed in parallel to, and between, the positive rail and the negative rail, the ground rail electrically grounded to a ground at the termination end, at the power supply end, and at a plurality of intervals between the power supply end and the termination end. The asymmetric resistor network may include, at the termination end: a first resistor having two terminals and a first resistance value, one terminal of the first resistor coupled to the positive rail and another terminal of the first resistor coupled to the ground rail, and a second resistor having two terminals and a second resistance value, one terminal of the second resistor coupled to the negative rail and another terminal of the second resistor coupled to the ground rail; and at the power supply end: a third resistor having two terminals and a third resistance value equal to the first resistance value, one terminal of the third resistor coupled to the negative rail and another terminal of the third resistor coupled to the ground rail, and a fourth resistor having two terminals and a fourth resistance value equal to the second resistance value, one terminal of the fourth resistor coupled to the positive rail and another terminal of the fourth resistor coupled to the ground rail. The asymmetric resistor network is configured to limit a fault current through a faulty connection in response to one or more of the positive rail, the negative rail, and the ground rail experiencing the faulty connection.

According to another aspect, an asymmetric resistor network for limiting a fault current in a three-rail power supply is provided, where the three-rail power supply includes a power supply having a positive rail, negative rail, and a ground rail, and a rail system includes a power supply end and a termination end. The asymmetric resistor network includes, at the termination end of the rail system: a first resistor having two terminals and a first resistance value, one terminal of the first resistor coupled to the positive rail and another terminal of the first resistor coupled to the ground rail, and a second resistor having two terminals and a second resistance value, one terminal of the second resistor coupled to the negative rail and another terminal of the second resistor coupled to the ground rail; and at the power supply end of the rail system: a third resistor having two terminals and a third resistance value equal to the first resistance value, one terminal of the third resistor coupled to the negative rail and another terminal of the third resistor coupled to the ground rail, and a fourth resistor having two terminals and a fourth resistance value equal to the second resistance value, one terminal of the fourth resistor coupled to the positive rail and another terminal of the fourth resistor coupled to the ground rail. The negative rail is coupled to a negative terminal of the power supply, the positive rail is coupled to the positive terminal of the power supply, and the ground rail is coupled to a neutral terminal of the power supply through a fifth resistor having a fifth resistance value and electrically grounded to a ground at the termination end, at the power supply end, and at a plurality of intervals between the power supply end and the termination end. The asymmetric resistor network is configured to limit a fault current through a faulty connection in response to one or more of the positive rail, the negative rail, and the ground rail experiencing the faulty connection.

According to yet another aspect, a method for limiting a fault current in a three-rail power supply is provided. The three-rail power supply includes a power supply and a rail system having a power supply end and a termination end and includes a positive rail, negative rail, and a ground rail. The method includes: at the termination end of the rail system, coupling a first terminal of a first resistor to the positive rail and a second terminal of the first resistor to the ground rail, the first resistor having a first resistance value, coupling a first terminal of a second resistor the negative rail and a second terminal of the second resistor to the ground rail, the second resistor having a second resistance value; at the power supply end of the rail system: coupling a first terminal of a third resistor to the negative rail and a second terminal of the third resistor to the ground rail, the third resistor having a third resistance value equal to the first resistance value, and coupling a first terminal of a fourth resistor to the positive rail and a second terminal of the fourth resistor to the ground rail, the fourth resistor having a fourth resistance value equal to the second resistance value. The negative rail is coupled to a negative terminal of the power supply, the positive rail is coupled to the positive terminal of the power supply, and the ground rail is coupled to a neutral terminal of the power supply through a fifth resistor having a fifth resistance value and electrically grounded to a ground at the termination end, at the power supply end, and at a plurality of intervals between the power supply end and the termination end; and in response to one or more of the positive rail, the negative rail, and the ground rail experiencing a faulty connection, limiting the fault current through the faulty connection.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 6 is a schematic view of the three-rail power supply system illustrating the negative rail directly contacting the ground rail as a faulty connection example.

FIG. 11 provides a flow chart representing an example operational process of the three-rail power supply system.

DETAILED DESCRIPTION

Figure 1:
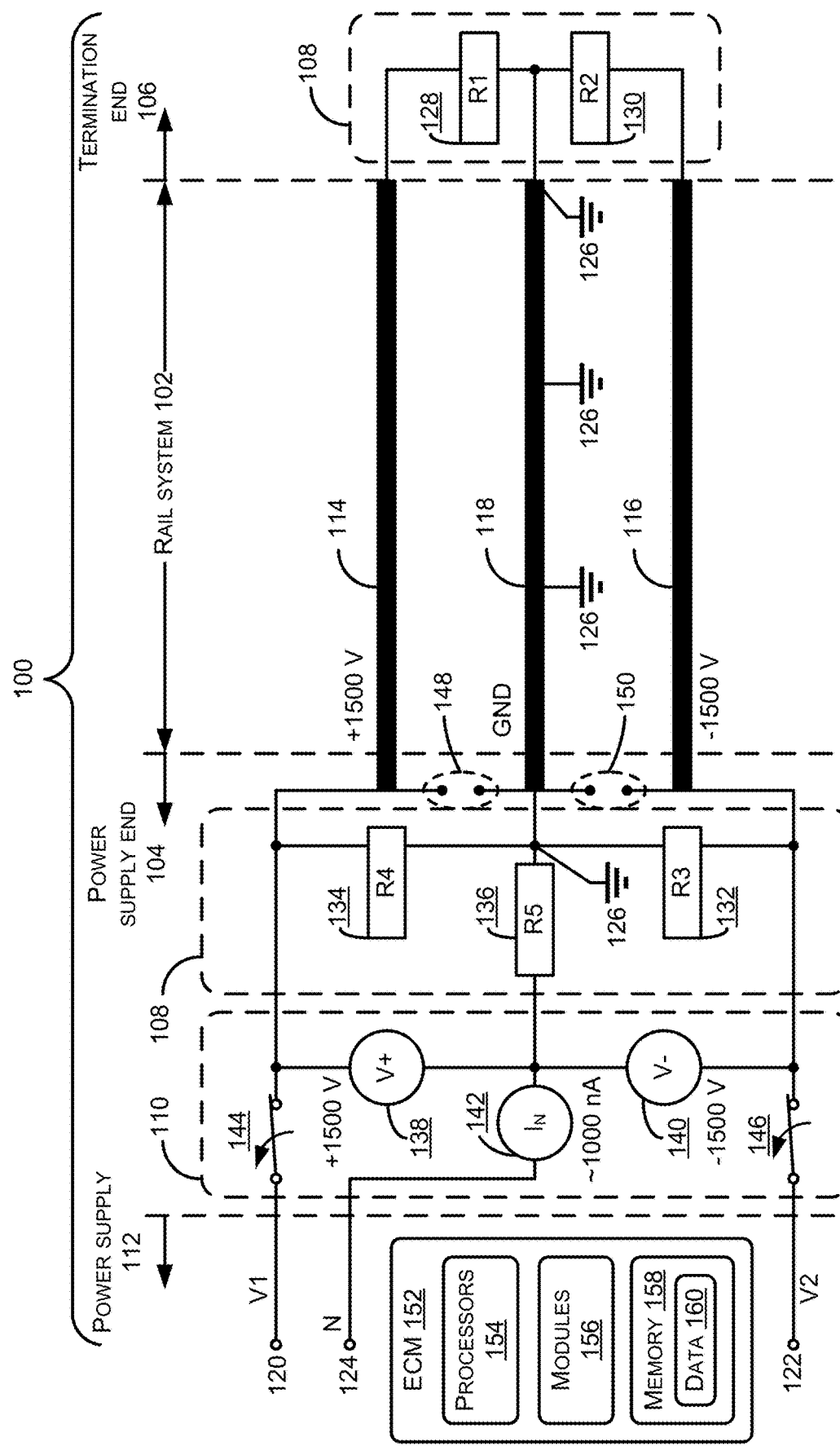
FIG. 1 is a schematic view of an example three-rail power supply system operating under normal conditions.

FIG. 1 is a schematic view of an example three-rail power supply system 100 operating under normal conditions. The tree-rail power supply system includes a rail system 102 having a power supply end 104 and a termination end 106, an asymmetric resistor network 108 asymmetrically coupled to each end of the rail system 102, and a fault detection circuit 110 coupled to a power supply 112 and the asymmetric resistor network 108 at the power supply end 104 of the rail system 102.

The rail system 102 comprises a positive rail 114, a negative rail 116, and a ground rail 118. At the power supply end 104, the positive rail 114 is coupled to a positive terminal 120, having a voltage V1, of the power supply 112, the negative rail 116 is coupled to a negative terminal 122, having a voltage V2, of the power supply 112, and the ground rail 118 is coupled to a neutral terminal 124 of the power supply 112. In this example, the power supply 112 is shown to provide V1=+1,500 V at the positive terminal 120 and V2=−1,500 V at the negative terminal 122. In this example, the positive rail 114 and the negative rail 116 are disposed parallel to each other, and the ground rail 118 is disposed in parallel to, and between, the positive rail 114 and the negative rail 116. The ground rail 118 electrically grounded, or earthed, at a plurality of ground connections 126 including at the termination end 106, at the power supply end 104, and at a plurality of intervals between the power supply end 104 and the termination end 106.

The asymmetric resistor network 108 is coupled to the rail system 102, and may comprise five resistors, a first resistor 128, a second resistor 130, a third resistor 132, a fourth resistor 134, and a fifth resistor 136, each of which has two terminals. The first resistor 128 and the second resistor 130 are coupled to rail system 102 the termination end 106, and the third resistor 132, the fourth resistor 134, and the fifth resistor 136 are coupled to the rail system 102 at the power supply end 104. The first resistor 128, having a first resistance value, R1, is coupled to the positive rail 114 at one terminal and to the ground rail 118 at the other terminal. The second resistor 130, having a second resistance value, R2, is coupled to the negative rail 116 at one terminal and to the ground rail 118 at the other terminal. The third resistor 132, having a third resistance, R3, which is equal to the resistance value of the first resistor 128, i.e., R1, is coupled to the negative rail 116 at one terminal and to the ground rail 118 at the other terminal. The fourth resistor 134, having a fourth resistance, R4, which is equal to the resistance value of the second resistor 130, i.e., R2, is coupled to the positive rail 114 at one terminal and to the ground rail 118 at the other terminal. The fifth resistor 136, having a fifth resistance value, R5, is coupled to the neutral terminal 124 at one terminal, and is grounded via the ground connection 126 and also connected to the ground rail 118 at the other terminal. The asymmetric resistor network 108 is configured as shown in FIG. 1 such that, when one or more of the positive rail 114, the negative rail 116, and the ground rail 118, experience a faulty connection, a fault current through the faulty connection is limited within a predetermined level as further described below.

As described above, the fault detection circuit 110 is coupled to the rail system 102 and the power supply 112 at the power supply end 104. The fault detection circuit 110 comprises a first voltage monitor 138, a second voltage monitor 140, a current monitor 142, a first switch 144, and a second switch 146. The first voltage monitor 138 is coupled to the positive rail 114 and to the neutral terminal 124 of the power supply 112, which is grounded through the fifth resistor 136, for monitoring a first voltage, V+, between the positive rail 114 and the neutral terminal 124, or equivalently, the first voltage between the positive rail 114 and the fifth resistor 136. The second voltage monitor 140 is coupled to the negative rail 116 and to the neutral terminal 124 of the power supply for monitoring a second voltage, V−, between the negative rail 116 and the neutral terminal 124, or equivalently, the second voltage between the negative rail 116 and the fifth resistor 136. The current monitor 142 is coupled to the neutral terminal 124 of the power supply 112 and to the ground 126 through the fifth resistor 136 for monitoring a neutral terminal current, $I_N$. The fault detection circuit 110 is configured to generate an alarm in response to the one or more of the positive rail 114, the negative rail 116, and the ground rail 118 experiencing a faulty connection generating an abnormal monitored value from at least one of the first voltage monitor 138, the second voltage monitor 140, or the current monitor 142. For example, the alarm may be displayed on a display of the power supply, transmitted to a back office associated with the three-rail power supply system 100, and/or sounded to notify an operator of the three-rail power supply system 100. The faulty connections described below with reference to FIGS. 2-10, include the positive rail 114 directly contacting the ground rail 118; the positive rail 114 electrically connected to the ground rail 118 though a first object; the positive rail 114 grounded through a second object; the negative rail 116 directly contacting the ground rail 118; the negative rail 116 electrically connected to the ground rail 118 through a third object; the negative rail 116 grounded through a fourth object; and the positive rail 114 electrically connected to the negative rail 116 through a fifth object.

Under normal operating conditions as shown in FIG. 1, the first voltage V+, monitored or read by the first voltage monitor 138, is the same as the voltage at the positive terminal 120 (V1), +1,500 V in this example; the second voltage V−, monitored or read by the second voltage monitor 140, is the same as the voltage at the negative terminal 122 (V2), −1,500 V in this example; and the neutral terminal current $I_N$ is about 1,000 nA. In other words, the magnitude of the first voltage V+ is the same as the second voltage V− under normal operating conditions, and one of the abnormal monitored value includes first voltage being different from the second voltage in magnitude. The difference in the voltage magnitude between the first voltage and the second voltage may be greater than a preselected value, 100 V for example, to be considered as an abnormal monitored value. The abnormal monitored value may also include the monitored neutral terminal current, $I_N$, exceeding a predetermined threshold, such as 10 mA, which is significantly higher than the normal value of 1,000 nA. When the monitored neutral terminal current, $I_N$, is increasing at a rate faster than a predetermined rate, indicating a short between the positive rail 114 and the negative rail 116, one or both of the first switch 144 and the second switch 146 are tripped open to disconnect the power supply 112 from the rail system 102.

The three-rail power supply system 100 additionally comprises a first surge protection device 148 and a second surge protection device 150 coupled to rail system 102 at the power supply end 104. The first surge protection device 148 is coupled to the positive rail 114 and the ground rail 118, and is configured to channel energy from the external surge source, such as a lightning, contacting the positive rail 114 to the ground rail 118. The second surge protection device 150 is coupled to the negative rail 116 and the ground rail 118, and is configured to channel energy from the external surge source, such as a lightning, contacting the negative rail 116 to the ground rail 118. If a lightning strikes the ground rail 118, the energy from the lightning is dissipated through the ground connections 126.

The three-rail power supply system 100 may additionally comprise an electronic control module (ECM) 152, which may control various aspects of the three-rail power supply system 100 discussed above. The ECM 152 houses one or more processors 154, which may execute any modules, components, or systems associated with the three-rail power supply system 100, some of which may be housed in the ECM 152 as shown as modules 156. In some examples, the processors 154 may include a central processing unit (CPU), a graphics processing unit (GPU), both CPU and GPU, or other processing units or components known in the art. Additionally, each of the processors 154 may possess its own local memory, which also may store program modules, program data, and/or one or more operating systems.

Computer-readable media, such as memory 158, associated with the three-rail power supply system 100 may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with the three-rail power supply system 100. In some examples, one or more of the modules may include or be associated with computer-executable instructions that are stored by the computer-readable media and that are executable by one or more processors to perform such operations. The memory 158 may store various data 160 associated with the operation of the three-rail power supply system 100.

For example, the ECM 152, by one or more modules of the modules 156, may compare the voltage values from the first voltage monitor 138 and the second voltage monitor 140, or read the current value and/or rate, and determine whether the three-rail power supply system 100 is operating normally as described above. In response to determining that the three-rail power supply system 100 is not operating normally, the ECM 152 may cause one or both of the first switch 144 and the second switch 146 to trip open to disconnect the power supply 112 from the rail system 102. The ECM 152, by one or more modules of the modules 156, may also generate an alarm, and display on a display of the power supply, transmit to a back office associated with the three-rail power supply system 100, and/or notify an operator of the three-rail power supply system 100.

In the examples illustrated in FIGS. 2-10 below, the parameters of the three-rail power supply system 100 are set as follows to describe exemplary operations of the three-rail power supply system 100 under various faulty connection condition:

$$V1 = +1,500\ V,\ V2 = -1,500\ V,\ R1 = R3 = 175\ k\Omega,$$

$$R2 = R4 = 225\ k\Omega,\ R5 = 100\ k\Omega.$$

Figure 2:
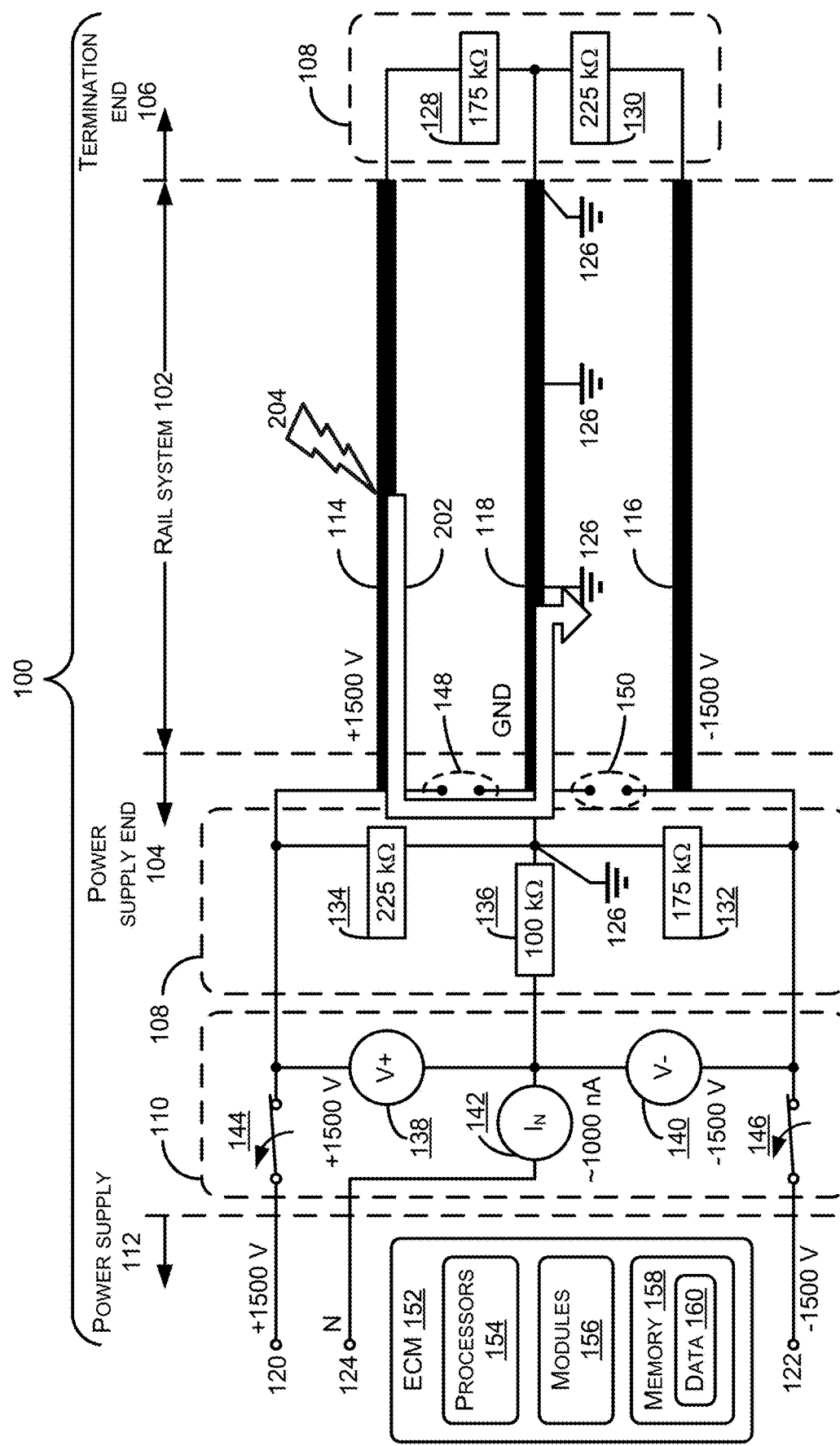
FIG. 2 is a schematic view of the three-rail power supply system illustrating an energy flow path for a lightning striking the positive rail.

FIG. 2 is a schematic view of the three-rail power supply system 100 illustrating an energy flow path 202 for a lightning 204 striking the positive rail 114. If an external surge source contacts the positive rail 114, such as the lightning 204 striking the positive rail 114, the first surge protection device 148 is configured to electrically close and channel the energy from the lightning 204 to the ground rail 118 as indicated by the energy flow path 202.

Figure 3:
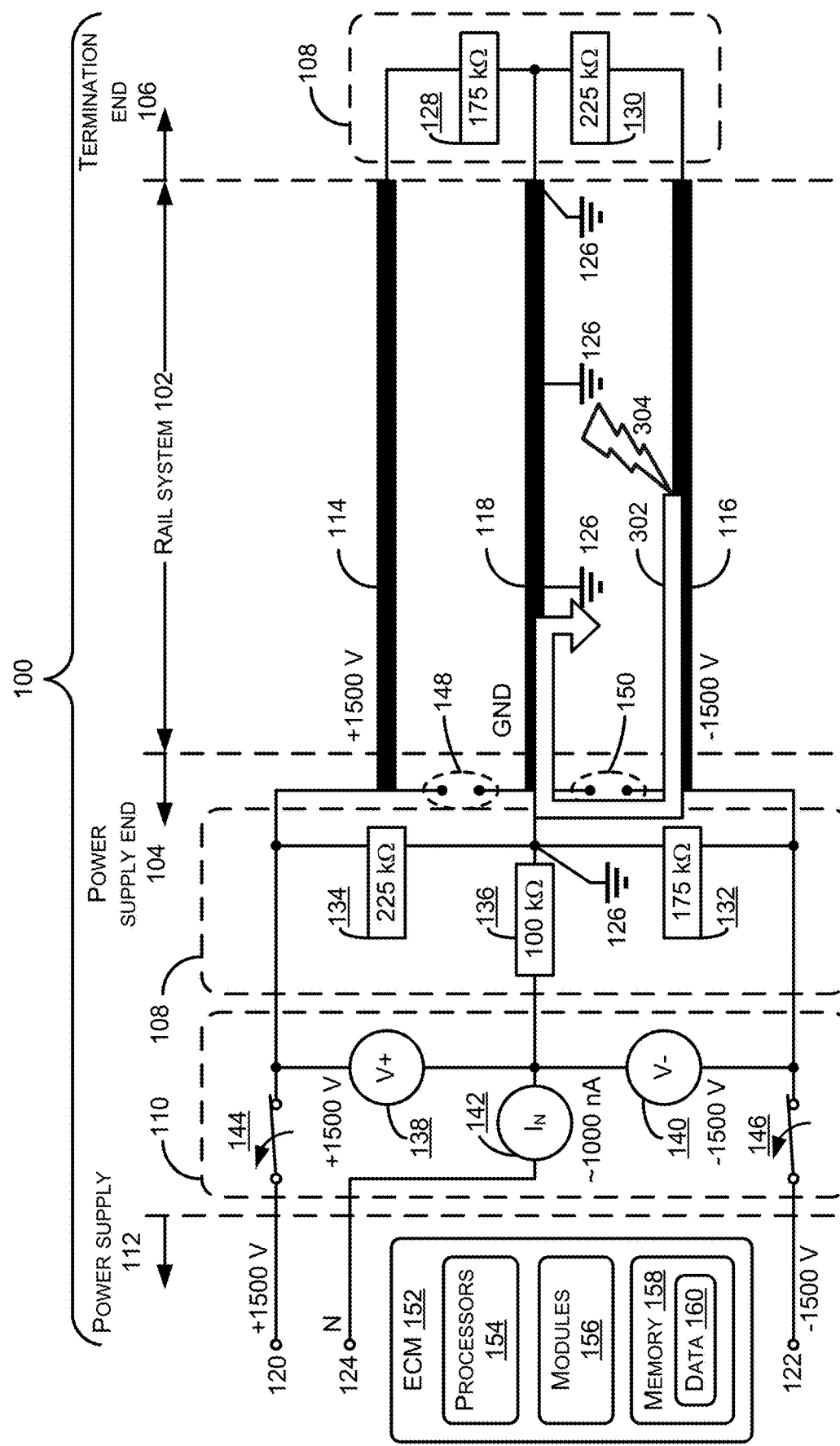
FIG. 3 is a schematic view of the three-rail power supply system illustrating an energy flow path for a lightning striking the negative rail.

FIG. 3 is a schematic view of the three-rail power supply system 100 illustrating an energy flow path 302 for a lightning 304 striking the negative rail 116. If an external surge source contacts the negative rail 116, such as the lightning 304 striking the negative rail 116, the second surge protection device 150 is configured to electrically close and channel the energy from the lightning 304 to the ground rail 118 as indicated by the energy flow path 302.

Figure 4:
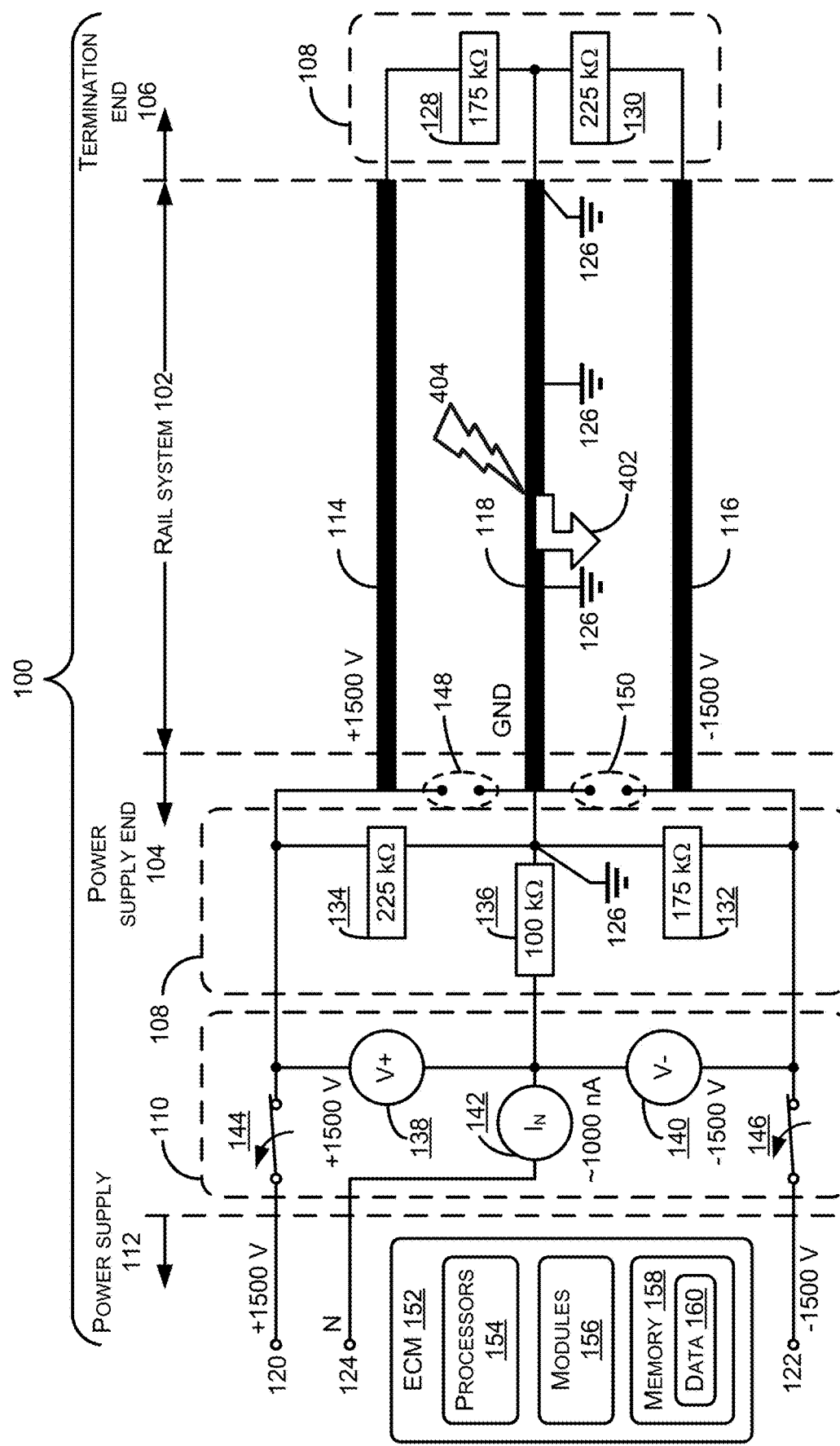
FIG. 4 is a schematic view of the three-rail power supply system illustrating an energy flow path for a lightning striking the ground rail.

FIG. 4 is a schematic view of the three-rail power supply system 100 illustrating an energy flow path 402 for a lightning 404 striking the ground rail 118. The energy from the lightning 404 is directly routed to, and dissipated through, the ground connections 126.

Figure 5:
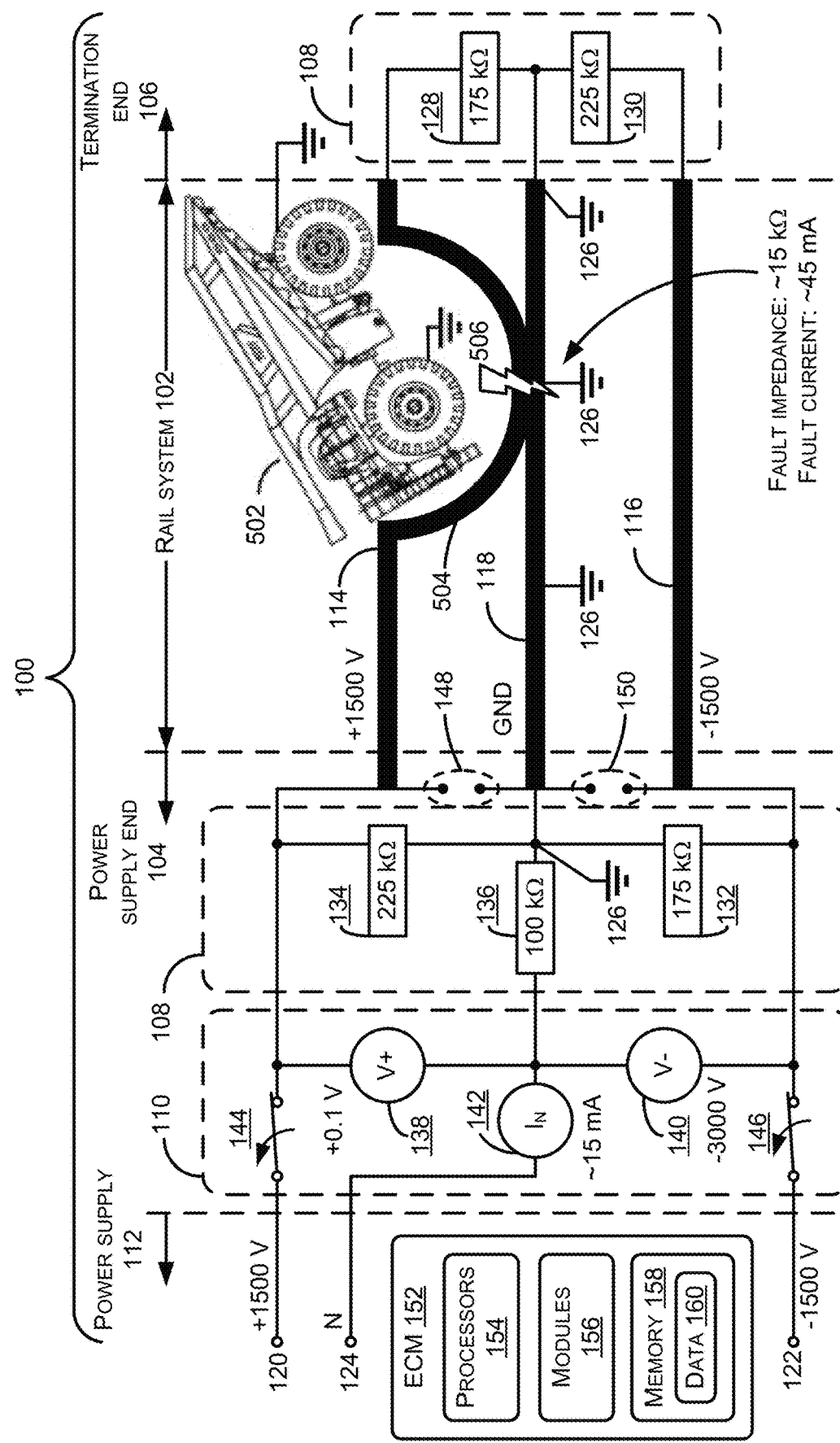
FIG. 5 is a schematic view of the three-rail power supply system illustrating the positive rail directly contacting the ground rail as a faulty connection example.

FIG. 5 is a schematic view of the three-rail power supply system 100 illustrating the positive rail 114 directly contacting the ground rail 118 as a faulty connection example. In this example, a machine 502, which is grounded via its wheels, is shown to have pushed a portion 504 of the positive rail 114 against the ground rail 118 making contact at a contact point 506 and resulting in a fault impedance of approximately 0Ω. With the asymmetric resistor network 108 under this faulty connection condition, a fault current is approximately 45 mA, the first voltage is approximately 0.1 V, the second voltage is approximately −3,000 V, and the neutral terminal current is approximately 15 mA.

Figure 6:
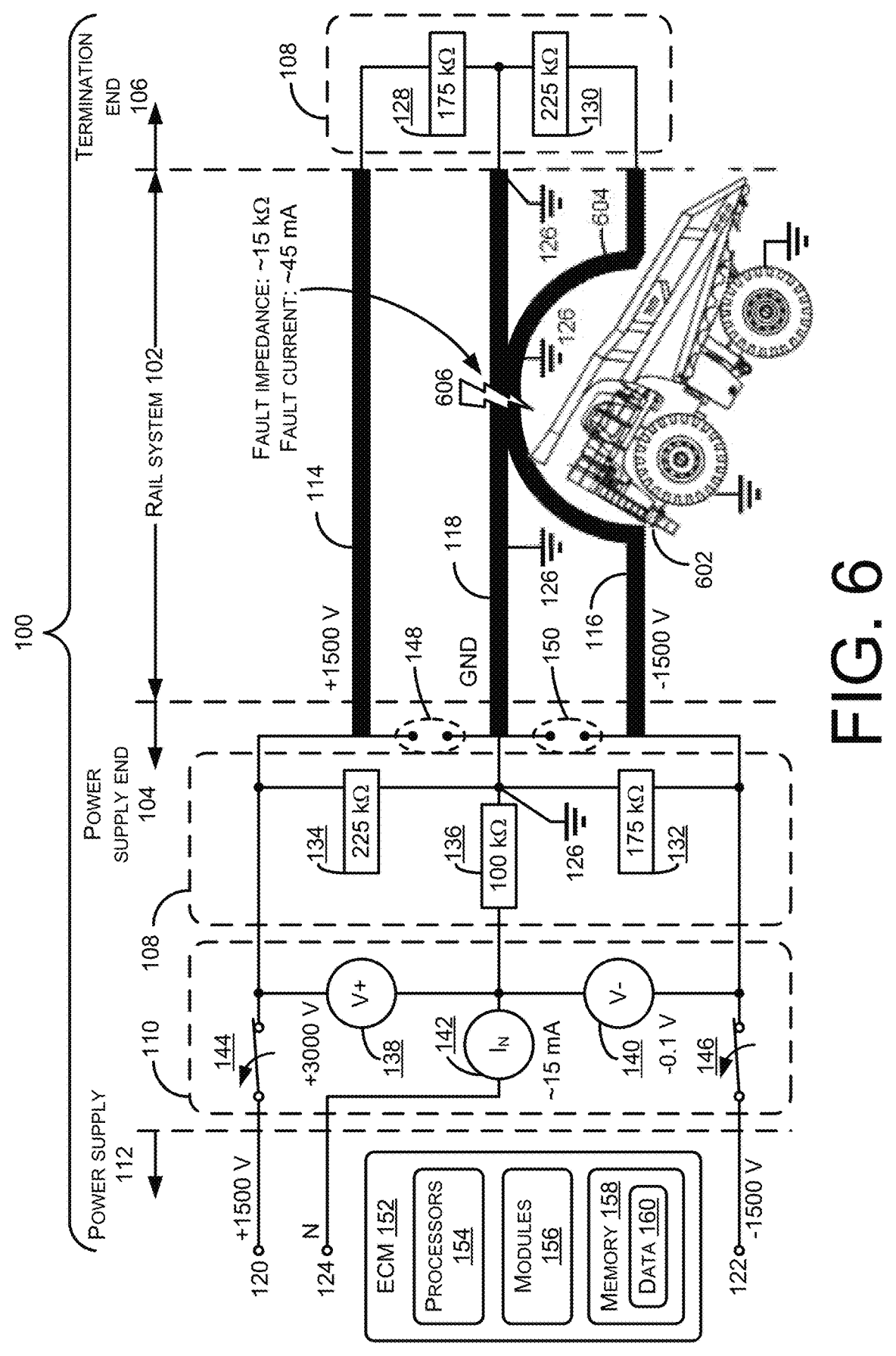

FIG. 6 is a schematic view of the three-rail power supply system 100 illustrating the negative rail 116 directly contacting the ground rail 118 as a faulty connection example. In this example, a machine 602, which is grounded via its wheels, is shown to have pushed a portion 604 of the negative rail 116 against the ground rail 118 making contact at a contact point 606 and resulting in a fault impedance of approximately 0Ω. With the asymmetric resistor network 108 under this faulty connection condition, a fault current is approximately 45 mA, the first voltage is approximately 3000 V, the second voltage is approximately −0.1 V, and the neutral terminal current is approximately 15 mA.

Figure 7:
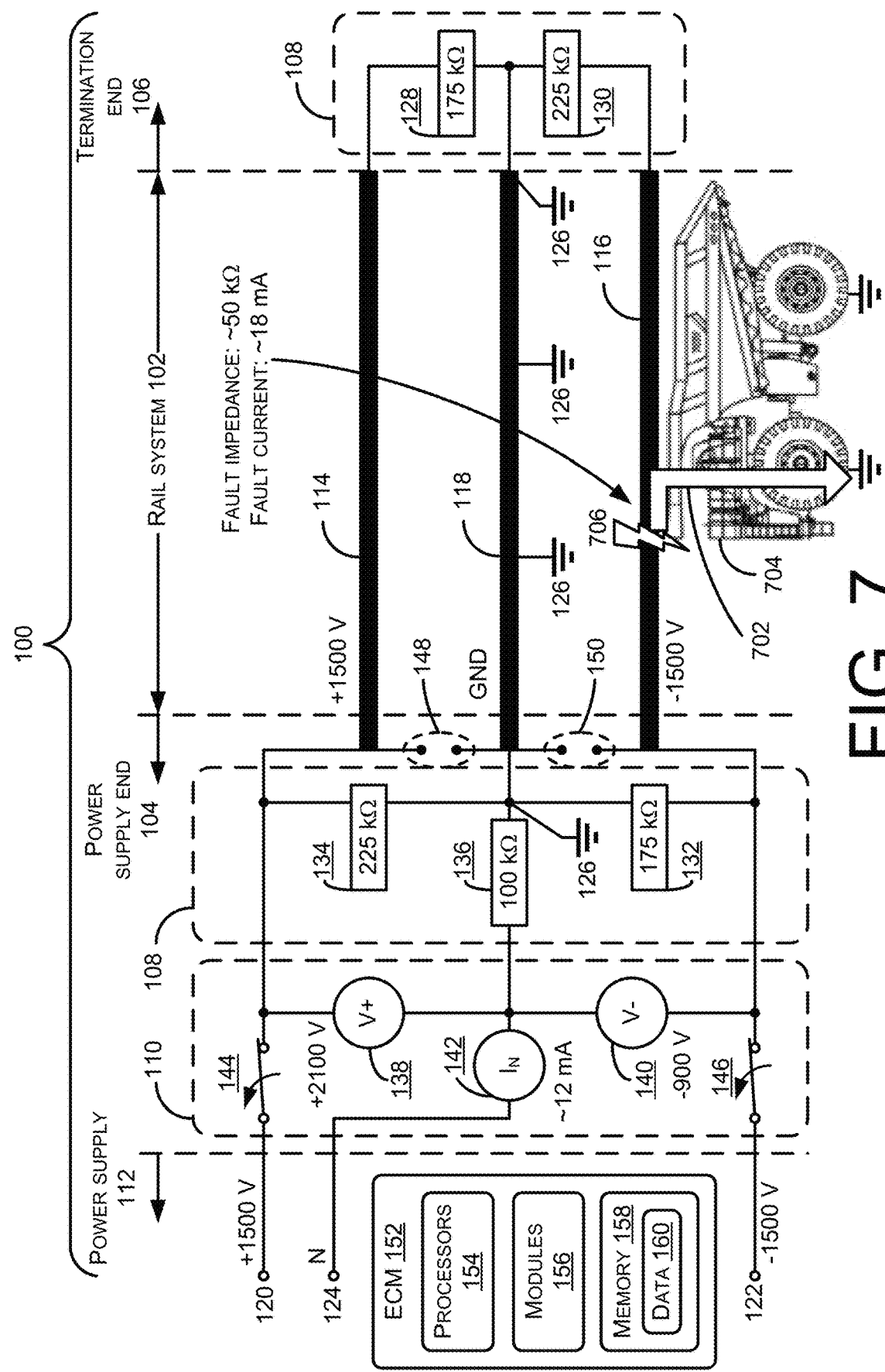
FIG. 7 is a schematic view of the three-rail power supply system illustrating the negative rail being electrically grounded though an object as a faulty connection example.

FIG. 7 is a schematic view of the three-rail power supply system 100 illustrating the negative rail 116 being electrically grounded via an electrical path 702, or connected to the ground rail 118 via the grounds, though an object 704 as a faulty connection example. In this example, the object 704 is a machine, which is grounded via its wheels, and is shown contacting the negative rail 116 at a contact point 706. The contact point 706 results in a fault impedance of approximately 50 kΩ through the object 704 to the ground. With the asymmetric resistor network 108 under this faulty connection condition, a fault current is approximately 18 mA, the first voltage is approximately 2100 V, the second voltage is approximately −900 V, and the neutral terminal current is approximately 12 mA.

Figure 8:
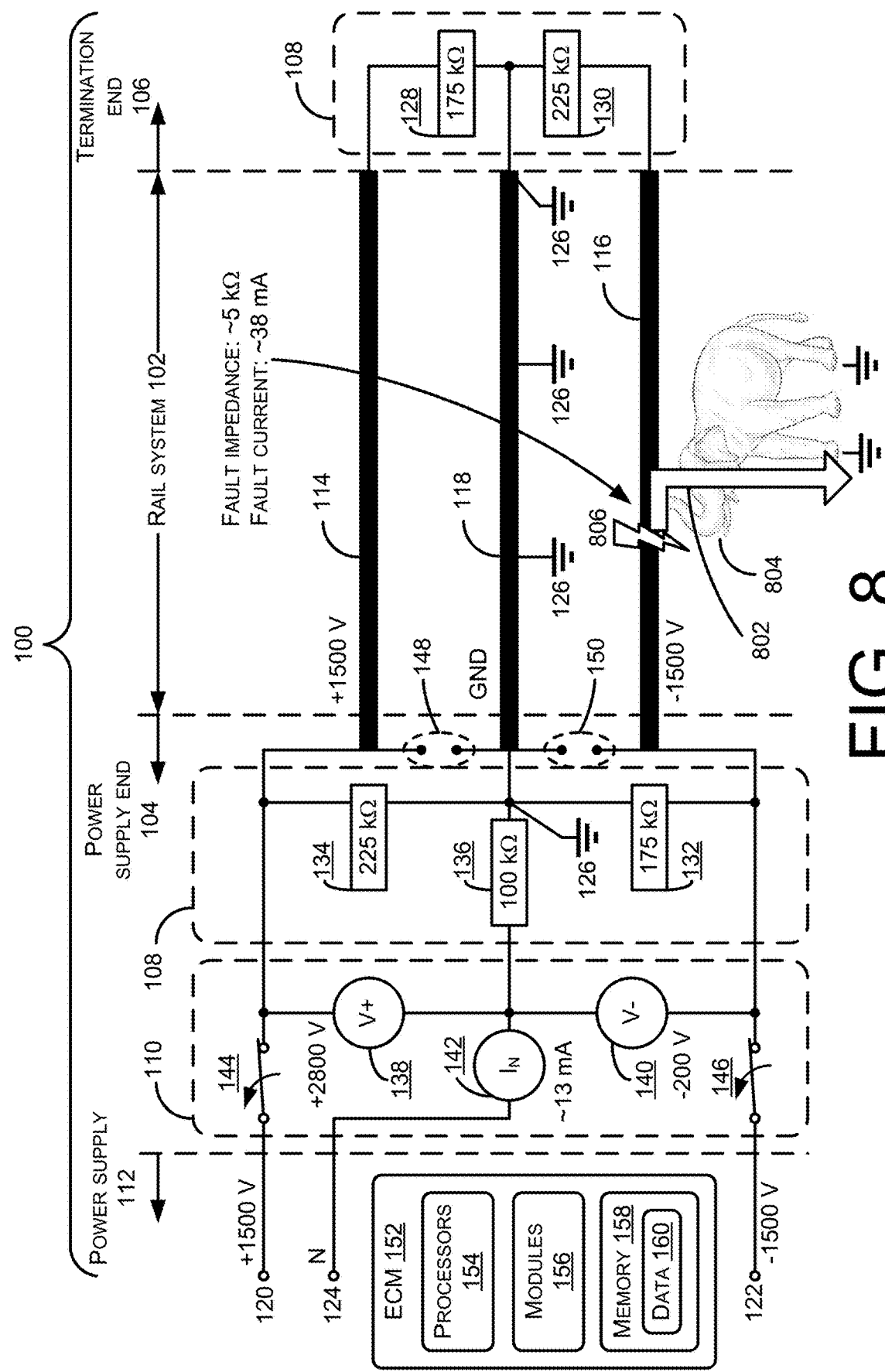
FIG. 8 is a schematic view of the three-rail power supply system illustrating the negative rail being electrically grounded though another object as a faulty connection example.

FIG. 8 is a schematic view of the three-rail power supply system 100 illustrating the negative rail 116 being electrically grounded via an electrical path 802, or connected to the ground rail 118 via the grounds, though another object 804 as a faulty connection example. In this example, the object 804 is a large live animal, such as an elephant, which is grounded via its feet. The object 804 is shown contacting the negative rail 116 at a contact point 806, which results in a fault impedance of approximately 5 kΩ. With the asymmetric resistor network 108 under this faulty connection condition, a fault current is approximately 38 mA, the first voltage is approximately 2800 V, the second voltage is approximately −200 V, and the neutral terminal current is approximately 13 mA.

Figure 9:
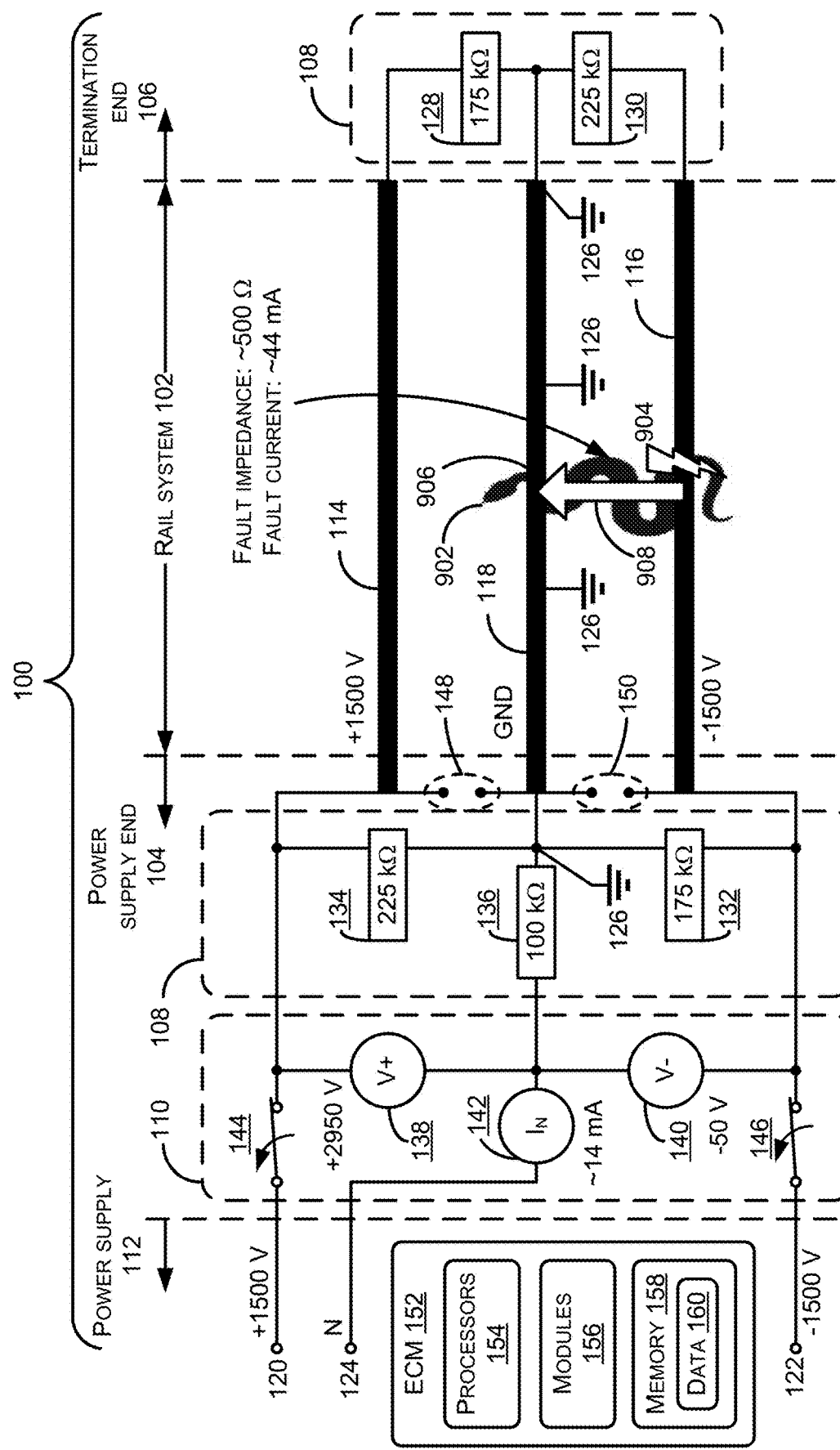
FIG. 9 is a schematic view of the three-rail power supply system illustrating the negative rail being electrically connected to the ground rail though an object as a faulty connection example.

FIG. 9 is a schematic view of the three-rail power supply system 100 illustrating the negative rail 116 being electrically connected to the ground rail 118 though an object 902 as a faulty connection example. In this example, the object 902 is a small animal, such as a snake contacting the negative rail 116 at a contact point 904 and the ground rail 118 at a contact point 906, thus providing an electrical path 908. The object 902 contacting both the negative rail 116 and the ground rail 118 results in a fault impedance of approximately 500Ω. With the asymmetric resistor network 108 under this faulty connection condition, a fault current is approximately 44 mA, the first voltage is approximately 2950 V, the second voltage is approximately −50 V, and the neutral terminal current is approximately 14 mA.

Figure 10:
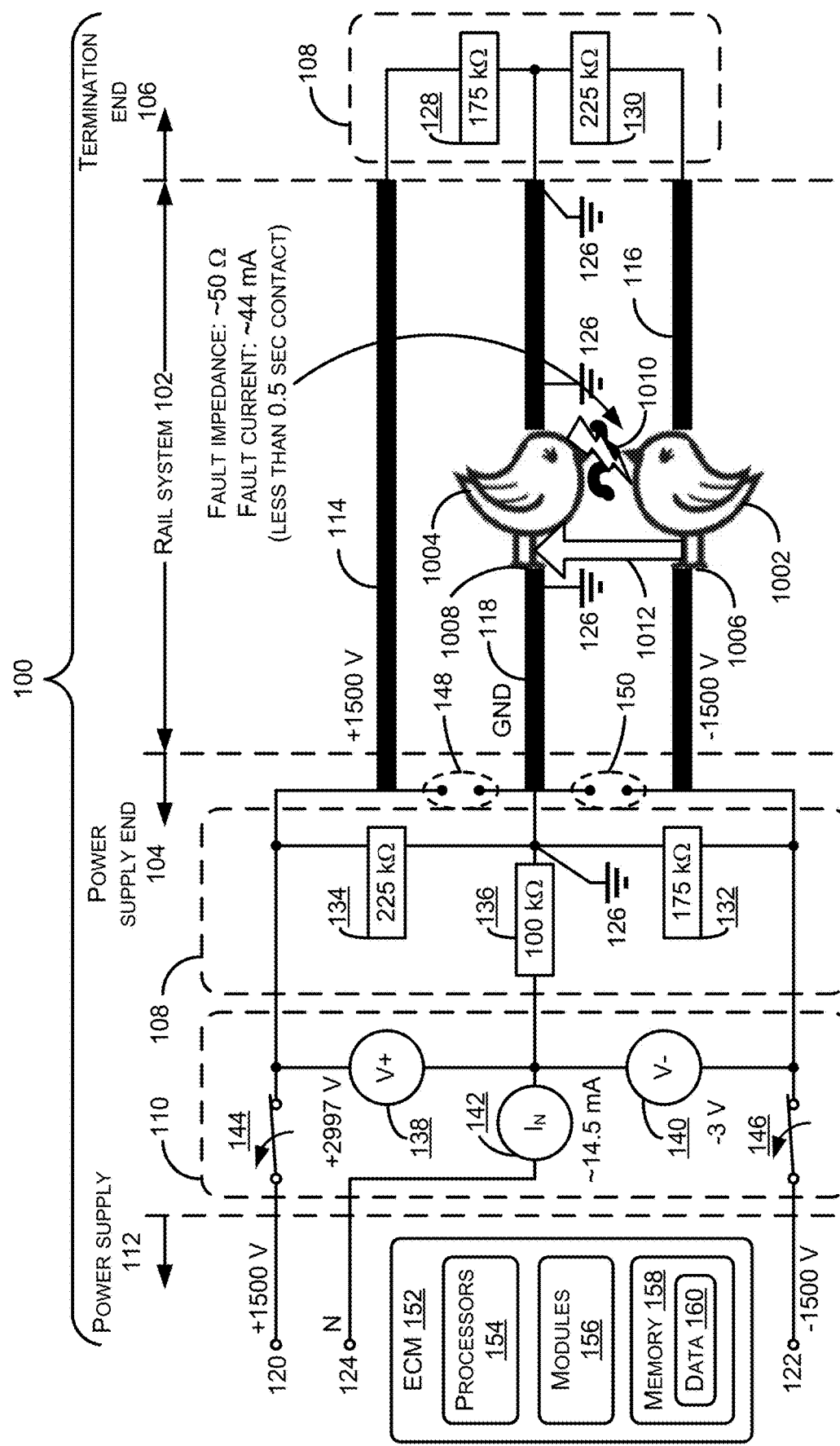
FIG. 10 is a schematic view of the three-rail power supply system illustrating the negative rail being intermittently connected to the ground rail though an object as a faulty connection example.

FIG. 10 is a schematic view of the three-rail power supply system 100 illustrating the negative rail 116 being intermittently connected to the ground rail 118 though an object as a faulty connection example. In this example, the object is a pair of small animals, such as a pair of birds, a first bird 1002 and a second bird 1004, intermittently contacting each other. For example, the first bird 1002 may be perched on the negative rail 116 at a point 1006 and the second bird 1004 may be perched on the ground rail 118 at a point 1008. The birds 1002 and 1004, while perched, may occasionally make a contact with each other 1010, thus providing an electrical path 1012 with a fault impedance of approximately 50Ω. With the asymmetric resistor network 108 under this faulty connection condition, an intermittent fault current is approximately 44 mA with an intermittent contact lasting less than 500 msec, the first voltage is approximately 2997 V, the second voltage is approximately −3 V, and the neutral terminal current is approximately 14.5 mA.

FIG. 11 provides a flow chart 1100 representing an example operational process for limiting a fault current in a three-rail power supply, such as the power supply 112 coupled to the rail system 102, by providing an asymmetric resistor network and a fault detection circuit, such as the asymmetric resistor network 108 and the fault detection circuit 110 as described above with reference to FIGS. 1-10. The power supply 112 has the positive terminal 120 coupled to the positive rail 114, the negative terminal 122 coupled to the negative rail 116, and the neutral terminal 124 is grounded through a resistor, such as the fifth resistor 136. The process of the flow chart 1100 is illustrated as a logical flow graph, operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process.

At block 1102, a first terminal and a second terminal of a first resistor, such as the first resistor 128 having a first resistance value, are coupled to the positive rail 114 and the ground rail 118, respectively at the termination end 106 of the rail system 102. At block 1104, a first terminal and a second terminal of a second resistor, such as the second resistor 130 having a second resistance value, are coupled to the negative rail 116 and the ground rail 118, respectively at the termination end 106. At block 1106, a first terminal and a second terminal of a third resistor, such as the third resistor 132 having the first resistance value, are coupled to the negative rail 116 and the ground rail 118, respectively at the power supply end 104 of the rail system 102. At block 1108, a first terminal and a second terminal of a fourth resistor, such as the fourth resistor 134 having the second resistance value, are coupled to the positive rail 114 and the ground rail 118, respectively at the power supply end 104.

At block 1110, a first voltage between the positive rail 114 and the neutral terminal 124, a second voltage between the negative rail 116 and the neutral terminal 124, and a current from the neutral terminal to the ground, are monitored at the power supply end. In response to one or more of the positive rail 114, the negative rail 116, and the ground rail 118 experiencing a faulty connection, the fault current through the faulty connection is limited at block 1112. The faulty connection may include at least one of the positive rail directly contacting the ground rail, the positive rail electrically connected to the ground rail though a first object, the positive rail grounded through a second object, the negative rail directly contacting the ground rail, the negative rail electrically connected to the ground rail through a third object, the negative rail grounded through a fourth object, and the positive rail electrically connected to the negative rail through a fifth object.

At block 1114, the fault detection circuit 110 via the ECM 152 may generate an alarm based on an abnormal monitored value from at least one of the first voltage monitor, the second voltage monitor, or the current monitor in response to the one or more of the positive rail, the negative rail, and the ground rail experiencing the faulty connection. For example, the alarm may be displayed on a display of the three-rail power supply system 100, transmitted to a back office associated with the three-rail power supply system 100, and/or sounded to notify an operator of the three-rail power supply system 100. The abnormal monitored value may include at least one of the first voltage being different from the second voltage in magnitude, the monitored neutral terminal current, $I_N$, exceeding a predetermined threshold, and the monitored neutral terminal current, $I_N$, increasing at a rate faster than a predetermined rate. The fault detection circuit 110 via the ECM 152 may cause the power supply 112 to disconnect from the rail system 102 in response to the monitored neutral terminal current increasing, $I_N$, at the rate faster than the predetermined rate by opening one or both of the first switch 144 and the second switch 146 as described above with reference to FIG. 1. Additionally, at the power supply end, a first surge protection device, such as the first surge protection device 148, and a second surge protection device, such as the second surge protection device 150, as described above with reference to FIG. 1, may be installed in the rail system 102 at the power supply end 104 for channeling energy from the external surge source, such as a lightning, to the ground rail 118.

INDUSTRIAL APPLICABILITY

The example systems and methods of the present disclosure are applicable to a power supply utilizing a three-rail (positive, negative, and neutral) system, and may be used in association with powering, or charging batteries of, variety of machines, such as, for example, marine vehicles, an agricultural vehicle, a paving machine, a mining machine, and/or construction vehicles.

For example, a three-rail power supply system may include a power supply, a rail system coupled to the power supply, and an asymmetric resistor network coupled to the rail system. The rail system may have a power supply end and a termination end, and include a positive rail coupled to a positive terminal of the power supply at the power supply end, a negative rail coupled to a negative terminal of the power supply at the power supply end, the negative rail disposed parallel to the positive rail, and a ground rail coupled to a neutral terminal of the power supply at the power supply end. The ground rail may be disposed in parallel to, and between, the positive rail and the negative rail, and may be electrically grounded to a ground at the termination end, at the power supply end, and at a plurality of intervals between the power supply end and the termination end. The asymmetric resistor network, at the termination end, includes a first resistor having two terminals and a first resistance value, one terminal of the first resistor coupled to the positive rail and another terminal of the first resistor coupled to the ground rail, and a second resistor having two terminals and a second resistance value, one terminal of the second resistor coupled to the negative rail and another terminal of the second resistor coupled to the ground rail. At the power supply end, the asymmetric resistor network includes a third resistor having two terminals and the first resistance value, one terminal of the third resistor coupled to the negative rail and another terminal of the third resistor coupled to the ground rail, and a fourth resistor having two terminals and the second resistance value, one terminal of the fourth resistor coupled to the positive rail and another terminal of the fourth resistor coupled to the ground rail. The asymmetric resistor network is configured to limit a fault current through a faulty connection in response to one or more of the positive rail, the negative rail, and the ground rail experiencing the faulty connection.

Additionally, the three-rail power supply system may include a fault detection circuit coupled to the rail system at the power supply end. The fault detection circuit includes a first voltage monitor, a second voltage monitor, and a current monitor. The first voltage monitor is coupled to, and for monitoring a first voltage between, the positive rail and the neutral terminal, which is grounded through a fifth resistor. The second voltage monitor is coupled to, and for monitoring a second voltage between, the negative rail and the neutral terminal. The current monitor is coupled to the neutral terminal and to the ground through the fifth resistor, for monitoring a current through the fifth resistor. The fault detection circuit is configured to generate an alarm based on an abnormal monitored value from at least one of the first voltage monitor, the second voltage monitor, or the current monitor.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A three-rail power supply system comprising:
a power supply;
a rail system having a power supply end and a termination end, the rail system comprising:
a positive rail coupled to a positive terminal of the power supply at the power supply end,
a negative rail coupled to a negative terminal of the power supply at the power supply end, the negative rail disposed parallel to the positive rail, and
a ground rail coupled to a neutral terminal of the power supply at the power supply end, the ground rail disposed in parallel to, and between, the positive rail and the negative rail, the ground rail electrically grounded to a ground at the termination end, at the power supply end, and at a plurality of intervals between the power supply end and the termination end; and
an asymmetric resistor network coupled to the rail system, the asymmetric resistor network comprising:
at the termination end:
a first resistor having two terminals and a first resistance value, one terminal of the first resistor coupled to the positive rail and another terminal of the first resistor coupled to the ground rail, and
a second resistor having two terminals and a second resistance value, one terminal of the second resistor coupled to the negative rail and another terminal of the second resistor coupled to the ground rail,
at the power supply end:
a third resistor having two terminals and a third resistance value equal to the first resistance value, one terminal of the third resistor coupled to the negative rail and another terminal of the third resistor coupled to the ground rail, and
a fourth resistor having two terminals and a fourth resistance value equal to the second resistance value, one terminal of the fourth resistor coupled to the positive rail and another terminal of the fourth resistor coupled to the ground rail,
wherein, in response to one or more of the positive rail, the negative rail, and the ground rail experiencing a faulty connection, the asymmetric resistor network is configured to limit a fault current through the faulty connection.

2. The three-rail power supply system of claim 1, further comprising:
a fault detection circuit coupled to the rail system at the power supply end, the fault detection circuit comprising:
a first voltage monitor, coupled to the positive rail and to the ground rail through a fifth resistor, for monitoring a first voltage between the positive rail and the ground rail,
a second voltage monitor, coupled to the negative rail and to the ground rail through the fifth resistor, for monitoring a second voltage between the negative rail and the ground rail, and
a current monitor, coupled to a neutral terminal of the power supply and to the ground through the fifth resistor, for monitoring a current through the fifth resistor,
wherein, in response to the one or more of the positive rail, the negative rail, and the ground rail experiencing the faulty connection, the fault detection circuit is configured to generate an alarm based on an abnormal monitored value from at least one of the first voltage monitor, the second voltage monitor, or the current monitor.

3. The three-rail power supply system of claim 2, wherein the abnormal monitored value includes the first voltage being different from the second voltage in magnitude.

4. The three-rail power supply system of claim 2, wherein the abnormal monitored value includes the monitored current exceeding a predetermined threshold.

5. The three-rail power supply system of claim 2, wherein the abnormal monitored value includes the monitored current increasing at a rate faster than a predetermined rate.

6. The three-rail power supply system of claim 5, wherein the fault detection circuit is further configured to cause the power supply to disconnect from the rail system in response to the monitored current increasing at the rate faster than the predetermined rate.

7. The three-rail power supply system of claim 1, wherein the faulty connection includes at least one of:
the positive rail directly contacting the ground rail;
the positive rail electrically connected to the ground rail though a first object;
the positive rail grounded through a second object;
the negative rail directly contacting the ground rail;
the negative rail electrically connected to the ground rail through a third object;
the negative rail grounded through a fourth object; and
the positive rail electrically connected to the negative rail through a fifth object.

8. The three-rail power supply system of claim 1, further comprising:
a first surge protection device coupled to the positive rail and the ground rail at the power supply end, the first surge protection device configured to channel energy from an external surge source contacting the positive rail to the ground rail; and
a second surge protection device coupled to the negative rail and the ground rail at the power supply end, the second surge protection device configured to channel energy from the external surge source contacting the negative rail to the ground rail.

9. An asymmetric resistor network for limiting a fault current in a three-rail power supply, the three-rail power supply including a power supply and a rail system, the rail system having a power supply end and a termination end and comprising a positive rail, negative rail, and a ground rail, the asymmetric resistor network comprising:
at the termination end of the rail system,
a first resistor having two terminals and a first resistance value, one terminal of the first resistor coupled to the positive rail and another terminal of the first resistor coupled to the ground rail, and
a second resistor having two terminals and a second resistance value, one terminal of the second resistor coupled to the negative rail and another terminal of the second resistor coupled to the ground rail; and
at the power supply end of the rail system,
a third resistor having two terminals and a third resistance value equal to the first resistance value, one terminal of the third resistor coupled to the negative rail and another terminal of the third resistor coupled to the ground rail, and a fourth resistor having two terminals and a fourth resistance value equal to the second resistance value, one terminal of the fourth resistor coupled to the positive rail and another terminal of the fourth resistor coupled to the ground rail, and wherein the negative rail is coupled to a negative terminal of the power supply, the positive rail is coupled to a positive terminal of the power supply, and the ground rail is coupled to a neutral terminal of the power supply through a fifth resistor having a fifth resistance value and electrically grounded to a ground at the termination end, at the power supply end, and at a plurality of intervals between the power supply end and the termination end, wherein, in response to one or more of the positive rail, the negative rail, and the ground rail experiencing a faulty connection, the asymmetric resistor network is configured to limit a fault current through the faulty connection.

10. The asymmetric resistor network of claim 9, further comprising:

a fault detection circuit coupled the rail system at the power supply end, the fault detection circuit comprising:

a first voltage monitor coupled to the positive rail, and coupled to the ground rail through the fifth resistor, for monitoring a first voltage between the positive rail and to the ground rail, a second voltage monitor coupled to the negative rail, and coupled to the ground rail through the fifth resistor, for monitoring a second voltage between the negative rail and to the ground rail, and a current monitor coupled to the neutral terminal of the power supply and to the ground through the fifth resistor for monitoring a current through the fifth resistor, wherein, in response to the one or more of the positive rail, the negative rail, and the ground rail experiencing the faulty connection, the fault detection circuit is configured to generate an alarm based on an abnormal monitored value from at least one of the first voltage monitor, the second voltage monitor, or the current monitor.

11. The asymmetric resistor network of claim 10, wherein the abnormal monitored value includes at least one of:

the first voltage being different from the second voltage in magnitude, the monitored current exceeding a predetermined threshold, and the monitored current increasing at a rate faster than a predetermined rate.

12. The asymmetric resistor network of claim 11, wherein the fault detection circuit is further configured to cause the power supply to disconnect from the rail system in response to the monitored current increasing at the rate faster than the predetermined rate.

13. The asymmetric resistor network of claim 9, wherein the faulty connection includes at least one of:

the positive rail directly contacting the ground rail;
the positive rail electrically connected to the ground rail though a first object;
the positive rail grounded through a second object;
the negative rail directly contacting the ground rail;

the negative rail electrically connected to the ground rail through a third object;
the negative rail grounded through a fourth object; and
the positive rail electrically connected to the negative rail through a fifth object.

14. The asymmetric resistor network of claim 9, further comprising, at the power supply end:

a first surge protection device coupled to the positive rail and the ground rail, the first surge protection device configured to channel energy from an external surge source contacting the positive rail to the ground rail; and a second surge protection device coupled to the negative rail and the ground rail, the second surge protection device configured to channel energy from the external surge source contacting the negative rail to the ground rail.

15. A method for limiting a fault current in a three-rail power supply, the three-rail power supply including a power supply and a rail system, the rail system having a power supply end and a termination end and comprising a positive rail, negative rail, and a ground rail, the method comprising:

at the termination end of the rail system, coupling a first terminal of a first resistor to the positive rail and a second terminal of the first resistor to the ground rail, the first resistor having a first resistance value, coupling a first terminal of a second resistor to the negative rail and a second terminal of the second resistor to the ground rail, the second resistor having a second resistance value, at the power supply end of the rail system, coupling a first terminal of a third resistor to the negative rail and a second terminal of the third resistor to the ground rail, the third resistor having a third resistance value equal to the first resistance value, and coupling a first terminal of a fourth resistor to the positive rail and a second terminal of the fourth resistor to the ground rail, the fourth resistor having a fourth resistance value equal to the second resistance value, wherein the negative rail is coupled to a negative terminal of the power supply, the positive rail is coupled to a positive terminal of the power supply, and the ground rail is coupled to a neutral terminal of the power supply through a fifth resistor having a fifth resistance value and electrically grounded to a ground at the termination end, at the power supply end, and at a plurality of intervals between the power supply end and the termination end, and in response to one or more of the positive rail, the negative rail, and the ground rail experiencing a faulty connection, limiting the fault current through the faulty connection.

16. The method of claim 15, further comprising:

at the power supply end of the rail system, monitoring a first voltage between the positive rail and the neutral terminal, monitoring a second voltage between the negative rail and the neutral terminal, and monitoring a current from the neutral terminal to the ground; and generating an alarm based on an abnormal monitored value from at least one of the first voltage, the second voltage, or the current in response to the one or more of the positive rail, the negative rail, and the ground rail experiencing the faulty connection.

17. The method of claim 16, wherein the abnormal monitored value includes at least one of:
the first voltage being different from the second voltage in magnitude,
the current exceeding a predetermined threshold, and
the current increasing at a rate faster than a predetermined rate.

18. The method of claim 17, further comprising:
causing the power supply to disconnect from the rail system in response to the current increasing at the rate faster than the predetermined rate.

19. The method of claim 15, wherein the faulty connection includes at least one of:
the positive rail directly contacting the ground rail;
the positive rail electrically connected to the ground rail though a first object;
the positive rail grounded through a second object;
the negative rail directly contacting the ground rail;
the negative rail electrically connected to the ground rail through a third object;
the negative rail grounded through a fourth object; and
the positive rail electrically connected to the negative rail through a fifth object.

20. The method of claim 15, further comprising, at the power supply end:
coupling a first surge protection device to the positive rail and the ground rail for channeling energy from an external surge source contacting the positive rail to the ground rail; and
coupling a second surge protection device to the negative rail and the ground rail for channeling energy from the external surge source contacting the negative rail to the ground rail.

* * * * *